United States Patent [19]

Rubenstein

[11] 3,925,689

[45] Dec. 9, 1975

[54] HIGH SPEED DATA BUFFER AND AMPLIFIER

[75] Inventor: Richard B. Rubenstein, New York, N.Y.

[73] Assignee: General Instrument Corporation, Clifton, N.J.

[22] Filed: Sept. 13, 1974

[21] Appl. No.: 505,560

[52] U.S. Cl. ................ 307/260; 307/205; 307/214; 307/DIG. 1

[51] Int. Cl.[2] ........................................... H03K 5/02

[58] Field of Search ...... 307/205, 208, 214, DIG. 1, 307/264; 330/38 M

[56] References Cited

UNITED STATES PATENTS 3,675,043 7/1972 Bell ................................ 307/208 X 3,801,831 4/1974 Dame ............................. 307/205 X

*Primary Examiner*—John Zazworsky

*Attorney, Agent, or Firm*—Roland Plottel

[57] ABSTRACT

A high-speed data buffer and amplifier which accepts input data at TTL levels and which is suitable for fabrication on an LSI chip. The circuit includes a pair of FET transistors, one of which is pre-charged by a clock pulse just prior to receipt of a strobing pulse, and an output stage which produces an amplified version of the input data with no significant time delay.

2 Claims, 4 Drawing Figures

HIGH SPEED DATA BUFFER AND AMPLIFIER

BACKGROUND OF THE INVENTION

1. Field of the Invention

Broadly speaking, this invention relates to digital computers. More particularly, in a preferred embodiment, this invention relates to a high-speed, TTL-compatible input buffer for the central processing unit of a computer and which is suitable for fabrication on an integrated circuit chip.

2. Discussion of the Prior Art

As is well known in the digital computer art, it is frequently necessary to buffer and amplify low-level data signals before they are applied to the central processing unit of the computer. In order that the overall operation of the computer not be unduly slowed, each such buffering and amplifying operation must take place at an extremely rapid pace which heretofore has dictated the use of simple MOS inverter stages. Unfortunately, such MOS devices are physically bulky and dissipate large quantities of power. It is, thus, virtually impossible to integrate them onto an LSI integrated circuit chip.

SUMMARY OF THE INVENTION

The problem then is to provide a high-speed buffer that can be fabricated on an integrated circuit chip using existing manufacturing techniques. This, and other problems, has been solved by the instant invention which comprises a high-speed data buffer and amplifier having first and second serially-connected transistors, the data signal to be amplified being connected to the source electrode of the first transistor; a first inverter interposed between the drain electrode of the first transistor and the source electrode of the second transistor; means, connected to the input of said first inverter, for supplying clock pulses of a first phase from an external source to the input of the first inverter to precharge the same; means, connected to the gate electrode of the first and second transistors, for supplying a control pulse from an external source, the pulse being of opposite phase to the clock pulse and gating the first and second transistors into conduction; third and fourth transistors serially connected between a supply potential and ground, the output of the buffer being connected to the juncture of the drain electrode of the third transistor and the source electrode of the fourth transistor; and a second inverter connected between the drain electrode of the second transistor and the gate electrode of the third transistor, the gate electrode of the fourth transistor being connected to the input of the second inverter.

DETAILED DESCRIPTION OF THE INVENTION

Figure 1:
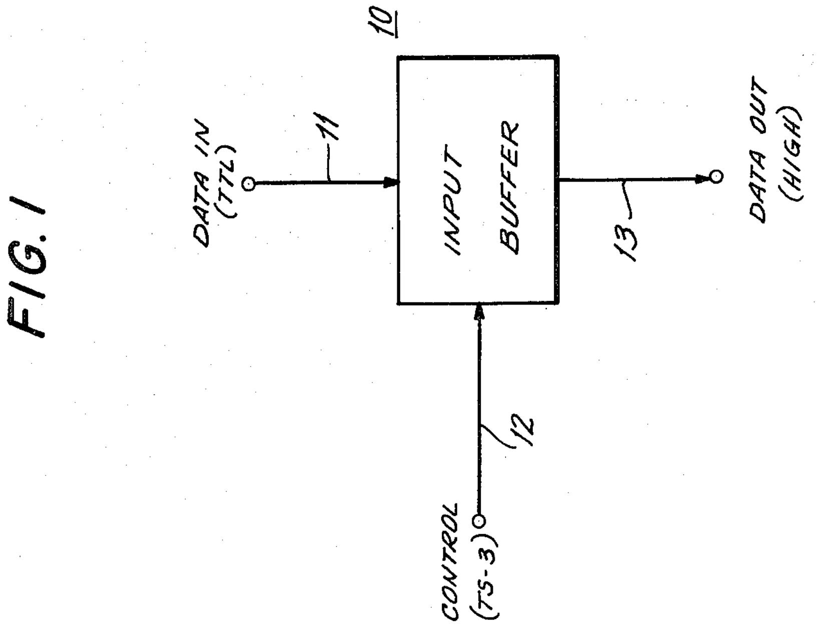
FIG. 1 is a simplified schematic drawing of a buffer according to the invention.

As shown in FIG. 1, the data input buffer 10 according to the invention accepts data input signals on lead 11 and, upon receipt of a control signal on lead 12, strobes the amplified signals to the central processing unit of the computer on lead 13.

The data input signals are at the TTL level, i.e. 2.4 volts or less, whereas the output signals are approximately at the potential of the supply VBB, i.e. 15 volts or less.

Figure 2:
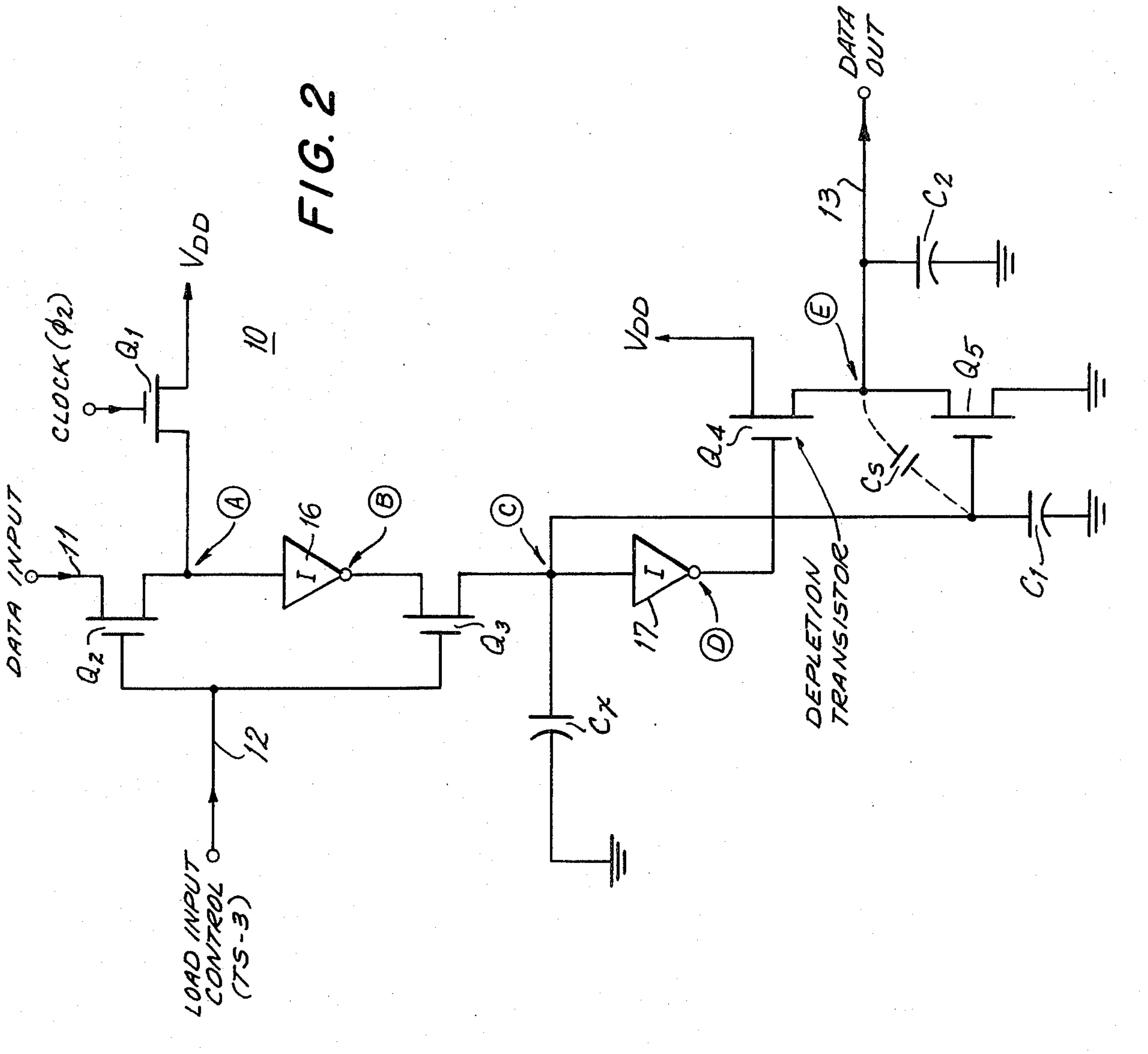
FIG. 2 is a schematic drawing of the buffer shown in FIG. 1 showing considerably more circuit detail.

FIG. 2 depicts the circuitry of FIG. 1 in greater detail. It will be noted that the buffer 10 comprises a plurality of interconnected FET transistors, inverters and capacitors but no resistors. It, thus, is suitable for LSI manufacture.

As shown in FIG. 3a and 3b, an external clock circuit (not shown) generates clock pulses $\phi_1$ and $\phi_2$ of opposite phase. As will be more fully explained later, the clock pulses are used to generate a series of timing pulses TS–1 to TS–4 (FIG. 3*c* to FIG. 3*f*) only one of which, TS–3 is relevant to this invention.

Figure 3:
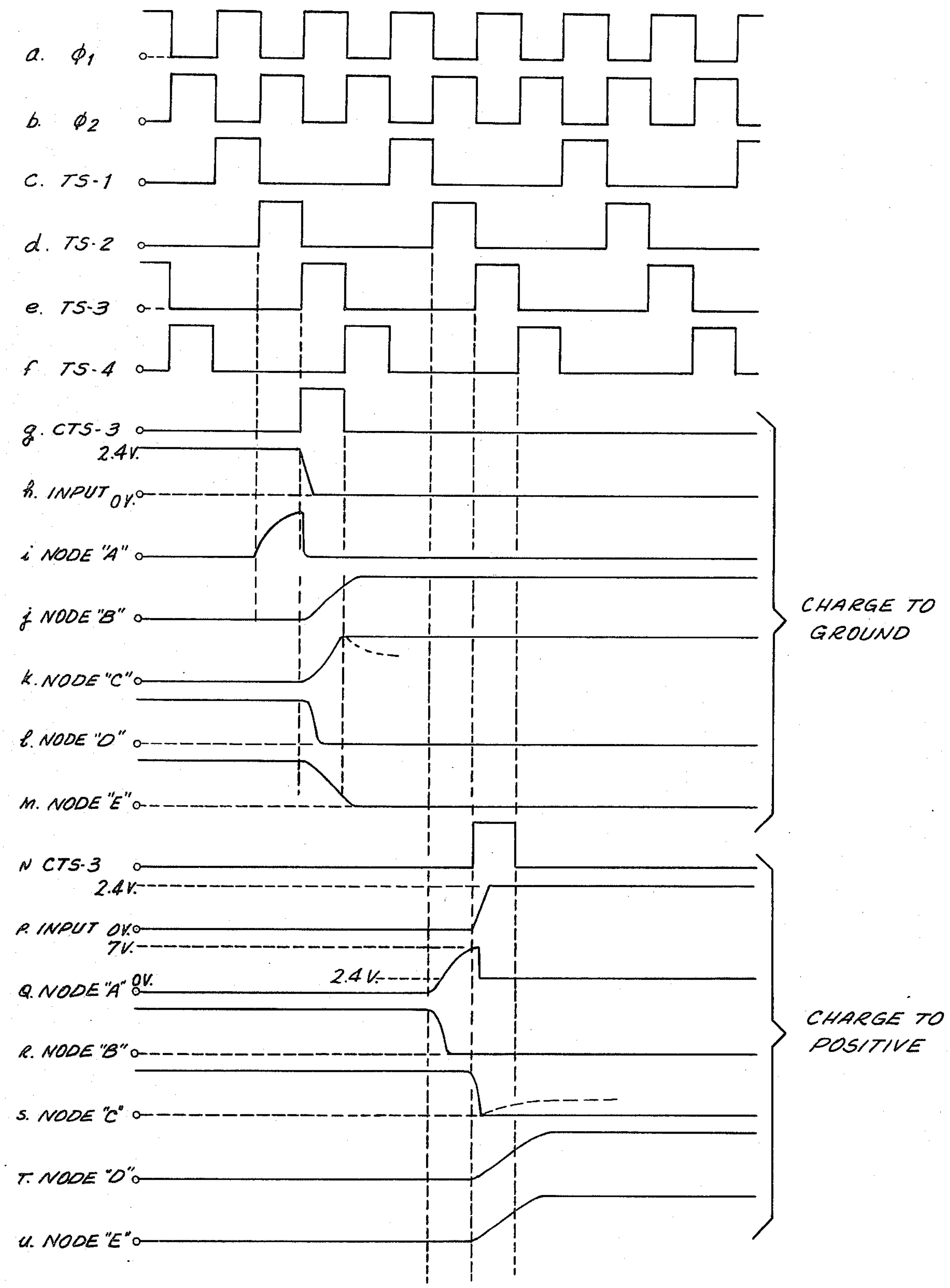
FIG. 3 depicts various wave-forms present in the circuit shown in FIG. 2.

The clock pulse $\phi_2$ is applied to the gate of FET transistor $Q_1$ which drives $Q_1$ into conduction, thus, precharging circuit node "A" positive towards VDD, the supply potential for the circuit. The pre-charging of node "A" is shown in FIG. 3, wave form Q.

A transistor $Q_2$ is serially connected with an inverter 16 and a transistor $Q_3$, as shown. The gates of transistors $Q_2$ and $Q_3$ are tied and connected to the load input control on lead 12. The data input on lead 11 is connected to the source electrode of transistor $Q_2$. The pulse occurring in time-slot TS–3 gates transistors $Q_2$ and $Q_3$ into conduction. Thus, if there is a positive-going data signal on lead 11 during TS–3, as shown in FIG. 3*p*, transistor $Q_2$ passes this positive-going signal to node "A" which, because it is precharged, rapidly drops back towards the potential of the data input pulse i.e. 2.4V (See FIG. 3Q).

Because of the action of inverter 16, node "B" will already have fallen to ground level during TS–2 (See FIG. 3R). Because transistor $Q_3$ is conducting, node "C" will tend to follow node "B" thus, during TS–3, node "C" will fall towards ground (See FIG. 3*s*).

Node C is connected, via an inverter 17, to the gate of a transistor $Q_4$ which is serially connected with a transistor $Q_5$ between VDD and ground. The data output on lead 13 connects to the juncture of $Q_4$ and $Q_5$.

Because of the Miller feedback capacitance, $C_s$, between the source and gate of $Q_5$ and the overlap capacitance of $Q_5$ (and similar capacitances in inverters 16 and 17) there is a tendency for node "C" to go positive again (shown by dotted lines in FIG. 3*s*). However, this tendency may be avoided by a metal oxide capacitor $Cx$ which is connected between node "C" and ground.

Because inverter 17 inverts the potential of node "C", node "D" will go positive during TS–3 and node "E", which connects to output lead 13, will follow this rise in potential. Thus, a positive-going TTL input pulse on lead 11 has been strobed by pulse CTS–3 (during time slot TS–3) on lead 12 and appears very rapidly in amplified form on lead 13 (See FIG. 3*u*).

Of course, the circuit of FIG. 2 is also a buffer and will store the input pulse on lead 11 until the strobing pulse CTS–3 arrives.

Operation of the circuit when the input pulse falls to ground (FIG. 3*h*) is entirely analogous and will not be described in detail. Suffice it to say that node "A" rapidly drops to ground (FIG. 3*i*) causing nodes "B" and "C" to rise (FIGS. 3*j* and 3*k*) and nodes "D" and "E" to fall to ground. Note again that the tendency of node "C" to fall back to ground (dotted line in FIG. 3*k*) is overcome by capacitor $Cx$.

Figure 4:
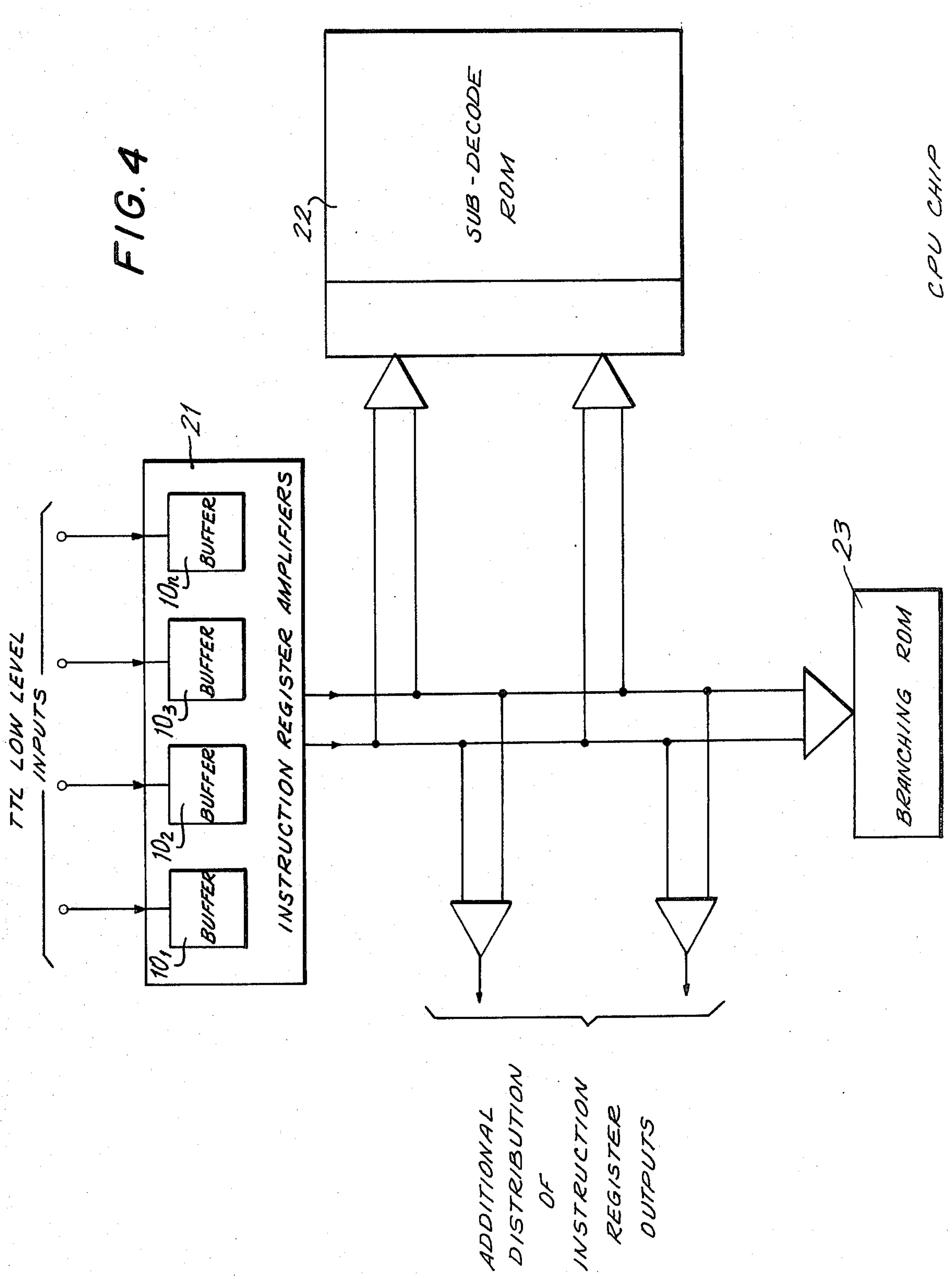
FIG. 4 depicts the working environment for the buffer shown in FIG. 2.

FIG. 4 illustrates the operating environment for the buffer amplifier of FIG. 2. As shown, an LSI CPU chip 20 has integrated thereon an instruction register amplifier 21 comprising a plurality of buffer-amplifiers $10_1$ – 10n according to the invention, each having a TTL-compatible low-level input and a high-level output. The high level outputs are connected, for example, to a sub-decode ROM, to a branching ROM or to any other desired distribution.

One skilled in the art may make various changes and substitutions to the arrangement of parts shown without departing from the spirit and scope of the invention.

What I claim is:

1. A high-speed data buffer and amplifier, which comprises:

first ($Q_2$) and second $Q_3$) serially-connected transistors, the data signal to be amplified being connected to the source electrode of said first transistor;

a first inverter (16) interposed between the drain electrode of said first transistor and the source electrode of said second transistor;

means ($Q_1$, VDD, $\phi$2), connected to the input of said first inverter, for supplying clock pulses of a first phase ($\phi$2) from an external source to the input of said first inverter to pre-charge the same;

means (12), connected to the gate electrode of said first and second transistors, for supplying a control pulse (CTS-3) from an external source, said pulse being of opposite phase to said clock pulse and gating said first and second transistors into conduction;

third ($Q_4$) and fourth ($Q_5$) transistors serially connected between a supply potential and ground, the output (13) of said buffer being connected to the juncture of the drain electrode of said third transistor and the source electrode of said fourth transistor; and a second inverter (17) connected between the drain electrode of said second transistor and the gate electrode of said third transistor, the gate electrode of said fourth transistor being connected to the input of said second inverter.

2. The buffer according to claim 1 further including a metal-oxide capacitor ($Cx$) connected between the input of the second inverter and ground to prevent overshoot or undershoot of the pulses appearing thereat.

* * * * *